(12) United States Patent
Sartore et al.

(10) Patent No.: US 7,809,973 B2
(45) Date of Patent: Oct. 5, 2010

(54) SPREAD SPECTRUM CLOCK FOR USB

(75) Inventors: Ronald H. Sartore, Poway, CA (US);
Timothy J. Williams, Bellevue, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 839 days.

(21) Appl. No.: 11/281,661

(22) Filed: Nov. 16, 2005

(65) Prior Publication Data

US 2007/0110142 A1    May 17, 2007

(51) Int. Cl.
*G06F 1/04* (2006.01)
(52) U.S. Cl. .................................. 713/500; 713/501
(58) Field of Classification Search ............... 713/500, 713/503; 709/230
See application file for complete search history.

(56) References Cited

U.S. PATENT DOCUMENTS

| | | | |
|---|---|---|---|
| 4,061,987 A | 12/1977 | Nagahama | |
| 4,272,760 A | 6/1981 | Prazak et al. | |
| 4,344,067 A | 8/1982 | Lee | |
| 4,534,030 A | 8/1985 | Paez et al. | |
| 4,686,386 A * | 8/1987 | Tadao | 327/143 |
| 4,689,740 A | 8/1987 | Moelands et al. | |
| 4,692,718 A | 9/1987 | Roza et al. | |
| 4,855,683 A | 8/1989 | Troudet et al. | |
| 4,868,525 A | 9/1989 | Dias | |
| 4,947,169 A | 8/1990 | Smith et al. | |
| 4,993,048 A | 2/1991 | Williams et al. | |
| 5,140,197 A | 8/1992 | Grider | |
| 5,150,079 A | 9/1992 | Williams et al. | |
| 5,175,884 A | 12/1992 | Suarez | |
| 5,200,751 A | 4/1993 | Smith | |
| 5,206,857 A | 4/1993 | Farleigh | |
| 5,304,955 A | 4/1994 | Atriss et al. | |
| 5,319,370 A | 6/1994 | Signore et al. | |
| 5,337,335 A | 8/1994 | Cloetens et al. | |
| 5,345,195 A | 9/1994 | Cordoba et al. | |
| 5,353,341 A | 10/1994 | Gillis et al. | |
| 5,381,116 A | 1/1995 | Nuckolls et al. | |
| 5,418,603 A | 5/1995 | Kusumoto et al. | |
| 5,420,543 A | 5/1995 | Lundberg et al. | |
| 5,428,319 A | 6/1995 | Marvin et al. | |

(Continued)

FOREIGN PATENT DOCUMENTS

EP    1351297    8/2003

(Continued)

OTHER PUBLICATIONS

International Search Report of the International Searching Authority for International Application No. PCT/US06/60111 mailed Mar. 18, 2008; 2 pages.

(Continued)

*Primary Examiner*—Nitin C Patel (57) ABSTRACT

A method, apparatus or system for generating a clock signal that includes determining a transmission frequency within a first frequency range for receiving or transmitting a data stream, locking a clock to the transmission frequency during a packet exchange and tuning the clock to one or more frequencies within a second frequency range after the packet exchange. The clock may be variably tuned to multiple frequencies within either the first or second range.

16 Claims, 4 Drawing Sheets

U.S. PATENT DOCUMENTS

| | | | |
|---|---|---|---|
| 5,440,305 | A | 8/1995 | Signore et al. |
| 5,446,867 | A | 8/1995 | Young et al. |
| 5,473,285 | A | 12/1995 | Nuckolls et al. |
| 5,495,205 | A | 2/1996 | Parker et al. |
| 5,506,875 | A | 4/1996 | Nuckolls et al. |
| 5,511,100 | A | 4/1996 | Lundberg et al. |
| 5,546,433 | A | 8/1996 | Tran et al. |
| 5,552,748 | A | 9/1996 | O'Shaughnessy |
| 5,559,502 | A | 9/1996 | Schutte |
| 5,563,553 | A | 10/1996 | Jackson |
| 5,565,819 | A | 10/1996 | Cooper |
| 5,583,501 | A | 12/1996 | Henrion et al. |
| 5,594,612 | A | 1/1997 | Henrion |
| 5,604,466 | A | 2/1997 | Dreps et al. |
| 5,666,118 | A | 9/1997 | Gersbach |
| 5,668,506 | A | 9/1997 | Watanabe et al. |
| 5,670,915 | A | 9/1997 | Cooper et al. |
| 5,673,004 | A | 9/1997 | Park |
| 5,675,813 | A | 10/1997 | Holmdahl |
| 5,682,049 | A | 10/1997 | Nguyen |
| 5,686,863 | A | 11/1997 | Whiteside |
| 5,689,196 | A | 11/1997 | Schutte |
| 5,699,024 | A | 12/1997 | Manlove et al. |
| 5,726,597 | A | 3/1998 | Petty et al. |
| 5,796,312 | A | 8/1998 | Hull et al. |
| 5,799,177 | A | 8/1998 | McKenzie et al. |
| 5,805,909 | A | 9/1998 | Diewald |
| 5,818,370 | A | 10/1998 | Sooch et al. |
| 5,825,317 | A | 10/1998 | Anderson et al. |
| 5,870,004 | A | 2/1999 | Lu |
| 5,870,345 | A | 2/1999 | Stecker |
| 5,898,345 | A | 4/1999 | Namura et al. |
| 5,933,058 | A | 8/1999 | Pinto et al. |
| 5,966,665 | A | 10/1999 | Taki |
| 6,065,126 | A | 5/2000 | Tran et al. |
| 6,091,758 | A | 7/2000 | Ciccone et al. |
| 6,157,266 | A | 12/2000 | Tsai et al. |
| 6,158,014 | A | 12/2000 | Henson |
| 6,191,660 | B1 | 2/2001 | Mar et al. |
| 6,211,739 | B1 | 4/2001 | Synder et al. |
| 6,215,835 | B1 | 4/2001 | Kyles |
| 6,272,644 | B1* | 8/2001 | Urade et al. ............... 713/320 |
| 6,279,058 | B1 | 8/2001 | Gulick |
| 6,294,962 | B1 | 9/2001 | Mar |
| 6,297,705 | B1 | 10/2001 | Williams et al. |
| 6,407,641 | B1 | 6/2002 | Williams et al. |
| 6,407,682 | B1 | 6/2002 | Jones |
| 6,515,551 | B1 | 2/2003 | Mar et al. |
| 6,525,616 | B1* | 2/2003 | Williams et al. ............ 331/44 |
| 6,529,988 | B1* | 3/2003 | Yoshikawa et al. ......... 710/305 |
| 6,650,699 | B1 | 11/2003 | Tierno |
| 6,664,859 | B1 | 12/2003 | Chen et al. |
| 6,727,763 | B2* | 4/2004 | Endo ........................ 331/17 |
| 6,732,163 | B1 | 5/2004 | Halasz |
| 6,753,739 | B1 | 6/2004 | Mar et al. |
| 6,762,635 | B2* | 7/2004 | Bruhnke et al. ............ 327/160 |
| 6,946,920 | B1 | 9/2005 | Williams et al. |
| 7,065,591 | B2* | 6/2006 | Han et al. ................... 710/62 |
| 7,091,860 | B2* | 8/2006 | Martinez de Velasco Cortina et al. ........................ 340/572.1 |
| 7,093,151 | B1* | 8/2006 | Williams .................... 713/500 |
| 7,093,153 | B1* | 8/2006 | Witek et al. ................ 713/600 |
| 7,127,628 | B2* | 10/2006 | Chang ....................... 713/400 |
| 7,155,631 | B2* | 12/2006 | Kiriake ...................... 713/600 |
| 7,158,759 | B2* | 1/2007 | Hansen et al. ............. 455/67.11 |
| 7,194,058 | B2* | 3/2007 | Jo et al. ..................... 375/376 |
| 7,210,054 | B2* | 4/2007 | Jahagirdar et al. .......... 713/502 |
| 7,224,349 | B2* | 5/2007 | Irie ........................... 345/204 |
| 7,230,971 | B1 | 6/2007 | Beard |
| 7,263,626 | B2* | 8/2007 | Kero et al. ................. 713/400 |
| 7,315,216 | B2* | 1/2008 | Yang et al. .................. 331/25 |
| 7,496,774 | B2* | 2/2009 | Lu ............................ 713/322 |
| 2002/0144165 | A1* | 10/2002 | Wright et al. ............... 713/320 |
| 2003/0093607 | A1 | 5/2003 | Main et al. |
| 2004/0117680 | A1 | 6/2004 | Naffziger |
| 2005/0057295 | A1 | 3/2005 | Tsai et al. |
| 2005/0083902 | A1* | 4/2005 | Hashimoto .................. 370/349 |
| 2005/0216780 | A1* | 9/2005 | Sung et al. .................. 713/500 |
| 2005/0227627 | A1 | 10/2005 | Cyr et al. |
| 2005/0243958 | A1* | 11/2005 | Fernald ...................... 375/360 |

FOREIGN PATENT DOCUMENTS

| | | |
|---|---|---|
| EP | 1351397 A1 | 8/2003 |
| WO | PCT/US96/17305 A1 | 6/1996 |
| WO | WO 97/36230 | 10/1997 |
| WO | PCT/US98/34376 A1 | 8/1998 |
| WO | PCT/US99/09712 A1 | 2/1999 |
| WO | 9919829 | 4/1999 |

OTHER PUBLICATIONS

Written Opinion of the International Searching Authority for International Application No. PCT/US06/60111 mailed Mar. 18, 2008; 5 pages.
USPTO Notice of Allowance for U.S. Appl. No. 10/147,828 dated Feb. 8, 2007; 8 pages.
USPTO Final Rejection for U.S. Appl. No. 10/147,828 dated Nov. 1, 2006; 10 pages.
USPTO Non-Final Rejection for U.S. Appl. No. 10/147,828 dated Jun. 9, 2006; 10 pages.
USPTO Final Rejection for U.S. Appl. No. 10/147,828 dated Jan. 23, 2006; 15 pages.
USPTO Non-Final Rejection for U.S. Appl. No. 10/147,828 dated Sep. 19, 2005; 10 pages.
USPTO Notice of Allowance for U.S. Appl. No. 09/668,801 dated Mar. 3, 2006; 4 pages.
USPTO Non-Final Rejection for U.S. Appl. No. 09/668,801 dated Sep. 19, 2005; 8 pages.
USPTO Final Rejection for U.S. Appl. No. 09/668,801 dated Jul. 6, 2005; 8 pages.
USPTO Non-Final Rejection for U.S. Appl. No. 09/668,801 dated Feb. 1, 2005; 7 pages.
USPTO Advisory Action for U.S. Appl. No. 09/668,801 dated Jan. 13, 2005; 3 pages.
USPTO Advisory Action for U.S. Appl. No. 09/668,801 dated Jan. 5, 2005; 3 pages.
USPTO Final Rejection for U.S. Appl. No. 09/668,801 dated Oct. 13, 2004; 8 pages.
USPTO Non-Final Rejection for U.S. Appl. No. 09/668,801 dated May 7, 2004; 7 pages.
USPTO Notice of Allowance for U.S. Appl. No. 09/511,019 dated Jan. 4, 2002; 4 pages.
USPTO Final Rejection for U.S. Appl. No. 09/511,019 dated Nov. 29, 2001; 5 pages.
USPTO Non-Final Rejection for U.S. Appl. No. 09/511,019 dated May 4, 2001; 5 pages.
USPTO Notice of Allowance for U.S. Appl. No. 09/511,020 dated May 2, 2001; 1 page.
USPTO Non-Final Rejection for U.S. Appl. No. 09/511,020 dated Nov. 28, 2000; 4 pages.
USPTO Notice of Allowance for U.S. Appl. No. 09/966,626 dated Oct. 10, 2002; 8 pages.
USPTO Final Rejection for U.S. Appl. No. 09/966,626 dated Jun. 26, 2002; 5 pages.
USPTO Non-Final Rejection for U.S. Appl. No. 09/966,626 dated Dec. 6, 2001; 6 pages.
USPTO Notice of Allowance for U.S. Appl. No. 10/339,115 dated Jan. 28, 2005; 6 pages.
USPTO Advisory Action for U.S. Appl. No. 10/339,115 dated Jul. 29, 2004; 3 pages.
USPTO Final Rejection for U.S. Appl. No. 10/339,115 dated Jun. 24, 2004; 5 pages.
USPTO Non-Final Rejection for U.S. Appl. No. 10/339,115 dated Jan. 28, 2004; 4 pages.

USPTO Non-Final Rejection for U.S. Appl. No. 10/339,115 dated Oct. 2, 2003; 3 pages.
USPTO Notice of Allowance for U.S. Appl. No. 08/868,079 dated Nov. 14, 2000; 3 pages.
USPTO Final Rejection for U.S. Appl. No. 08/868,079 dated Sep. 20, 2000; 4 pages.
USPTO Non-Final Rejection for U.S. Appl. No. 08/868,079 dated Apr. 12, 2000; 6 pages.
USPTO Final Rejection for U.S. Appl. No. 08/868,079 dated Dec. 17, 1999; 7 pages.
USPTO Non-Final Rejection for U.S. Appl. No. 08/868,079 dated Jul. 1, 1999; 6 pages.
USPTO Advisory Action for U.S. Appl. No. 08/868,079 dated Mar. 26, 1999; 2 pages.
USPTO Final Rejection for U.S. Appl. No. 08/868,079 dated Jan. 27, 1999; 7 pages.
USPTO Non-Final Rejection for U.S. Appl. No. 08/868,079 dated Jan. 22, 1998; 7 pages.
"Universal Serial Bus Specification," Revision 1.0, Chapter 7, Jan. 1996, pp. 111-143; 34 pages.
USPTO Notice of Allowance for U.S. Appl. No. 09/275,336 dated Sep. 27, 2000; 1 page.
USPTO Final Rejection for U.S. Appl. No. 09/275,336 dated Aug. 31, 2000; 5 pages.
USPTO Non-Final Rejection for U.S. Appl. No. 09/275,336 dated Apr. 21, 2000; 6 pages.
USPTO Notice of Allowance for U.S. Appl. No. 09/721,316 dated Sep. 23, 2002; 5 pages.
USPTO Final Rejection for U.S. Appl. No. 09/721,316 dated May 3, 2002; 5 pages.
USPTO Non-Final Rejection for U.S. Appl. No. 09/721,316 dated Aug. 7, 2001; 3 pages.
USPTO Non-Final Rejection for U.S. Appl. No. 09/721,316 dated Apr. 24, 2001; 4 pages.
USPTO Notice of Allowance for U.S. Appl. No. 10/342,455 dated Feb. 12, 2004; 4 pages.
USPTO Non-Final Rejection for U.S. Appl. No. 10/342,455 dated Nov. 6, 2003; 4 pages.
USPTO Non-Final Rejection for U.S. Appl. No. 10/342,455 dated Aug. 21, 2003; 4 pages.
CY7C63722/23 CY7C63742/43 enCoRe USB Combination Low-Speed USB & PS/2 Peripheral Controller, Cypress Semiconductor Corporation, Revised May 2000; 48 pages.
CY7C63221/31 enCoRe USB Low-Speed USB Peripheral Controller, Cypress Semiconductor Corporation, Revised May 2000; 40 pages.
Sam Yinshang Sun, "An Analog PLL-Based Clock and Data Recovery Circuit with High Input Jitter Tolerance," Reprinted from IEEE Journal of Solid-State Circuits, vol. SC-24, pp. 325-330, Apr. 1989, pp. 383-385; 4 pages.
Robert A. Blauschild, "WP 3.5: An Integrated Time Reference," ISSCC94/Session 3, Analog Techniques/Paper WP 3.5, Feb. 1994, pp. 56-58; 4 pages.
Bakker et al., "Micropower CMOS Temperature Sensor with Digital Output," IEEE, Jul. 1996; 3 pages.
Kim et al., "A 30-MHz Hybrid Analog/Digital Clock Recovery Circuit in 2-um CMOS," IEEE Journal of Solid-State Circuits, vol. 25, No. 6, Dec. 1990, pp. 1385-1394; 10 pages.
USPTO Notice of Allowance for U.S. Appl. No. 09/207,912 dated May 7, 2001; 3 pages.
USPTO Non-Final Rejection for U.S. Appl. No. 09/207,912 dated Jan. 26, 2001; 4 pages.
USPTO Advisory Action for U.S. Appl. No. 09/207,912 dated Dec. 22, 2000; 1 page.
USPTO Final Rejection for U.S. Appl. No. 09/207,912 dated Oct. 11, 2000; 5 pages.
USPTO Non-Final Rejection for U.S. Appl. No. 09/207,912 dated Apr. 19, 2000; 5 pages.
USPTO Non-Final Rejection for U.S. Appl. No. 09/207,912 dated Nov. 10, 1999; 6 pages.
Universal Serial Bus Specification, Revision 2.0, Apr. 27, 2000, pp. 1-622; 622 pages.
Universal Serial Bus Specification, Revision 1.1, Sep. 23, 1998, pp. 1-311; 311 pages.

* cited by examiner

SPREAD SPECTRUM CLOCK FOR USB

BACKGROUND OF THE INVENTION

The invention relates to reducing electromagnetic emissions in electronic devices.

Some Universal Serial Bus (USB) devices use crystal-less oscillators to generate clock signals while providing proper communication and compliance with the USB standard. Instead of using a relatively expensive crystal oscillator, the crystal-less oscillator derives a clock signal internally from a USB data stream.

These crystal-less oscillators maintain a substantially constant clock frequency by locking-in to the USB data stream sent by the USB host. Generally these crystal-less oscillator circuits cannot vary the frequency beyond the range allowed by the USB system, since this would lead to communication failures.

Unfortunately, maintaining a substantially constant operating frequency increases the undesirable effects from electromagnetic emissions both for devices next to the USB device and for circuitry within the USB device. As a result, much of the cost saving from crystal-less oscillator circuits are lost to the additional electromagnetic shielding that is used in the USB device.

SUMMARY OF THE INVENTION

A timing circuit derives a clock from a data transmission signal and then operates the clock within an allowable frequency tolerance during a data exchange. The timing circuit then tunes the clock to other frequencies after the packet exchange that may be outside of the normal operating tolerance for transferring data. Varying the operating frequency in this manner reduces the effects of electromagnetic emissions while also eliminating the need for expensive crystal oscillators.

The foregoing and other objects, features and advantages of the invention will become more readily apparent from the following detailed description of a preferred embodiment of the invention which proceeds with reference to the accompanying drawings.

DETAILED DESCRIPTION

Universal Serial Bus (USB) is a high speed serial interface used to connect a host device, such as a personal computer, to one or more peripheral devices such as a keyboard, mouse, printer, modem, or digital camera. Throughout the development of modern computer systems, peripheral devices have had any number of different interface connector types, usually designed according to the specifications of the device manufacturer. The USB architecture was designed as a universal interface that works with a wide variety of different devices made by different manufacturers.

Figure 1:
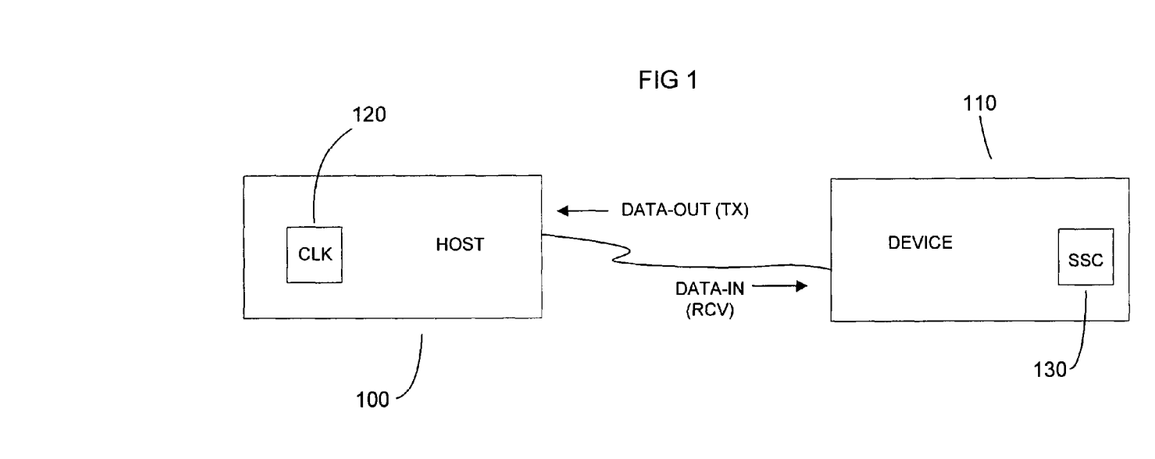
FIG. 1 is a block diagram of a USB host and peripheral device.

FIG. 1 shows a simple block diagram of a USB system including a USB host 100 and a peripheral device 110. The USB host 100 initiates communication with the peripheral device 110 by sending a command or request which the peripheral device 110 receives as Data-In. Data-In is sent by the USB host 100 with an associated data rate and frequency as determined by a host clock 120. The peripheral device 110 typically operates at approximately the same frequency or a multiple of the frequency associated with the Data-In. If not operating at an appropriate frequency, it is desirable for the peripheral device 110 to adjust its own frequency to operate within the appropriate frequency. Data-Out sent by the peripheral device 110 to the USB host 100 should be transmitted at approximately the same frequency as Data-In.

Peripheral devices typically require an external or master clock, often a crystal, that maintains the peripheral device clock speed within an operable frequency range. The peripheral device 110 may also include frequency tuning circuitry that corrects the clock frequency when it deviates from the operable frequency range.

In an alternative embodiment, the peripheral device 110 includes oscillator circuitry that tunes the frequency of the clock according to the operable frequency range without using external components. The operable frequency range may be determined by locking to a data stream, as a type of recovered clock, and without the use of a crystal. By using crystal-less oscillator circuitry, the cost and complexity associated with the crystal can be eliminated. USB Systems that lock clock frequencies to a recovered clock are described in U.S. Pat. No. 6,297,705, entitled: Circuit for Locking an Oscillator to a Data Stream; U.S. Pat. No. 6,407,641, entitled: Auto-Locking Oscillator for Data Communications; and U.S. Pat. No. 6,525,616, entitled: Circuit for Locking an Oscillator to a Data Stream. These patents are all assigned to Cypress Semiconductor Corporation, the assignee of the present patent, and are hereby incorporated by reference in entirety.

As discussed, the peripheral device 110 may use an external clock or a recovered clock to lock to the operable frequency during communication. In either case, the peripheral device 110 generally transmits Data-Out to the USB host 100 at approximately the same frequency that the host clock 120 transmits Data-In. When the peripheral device 110 contains frequency tuning circuitry, it is not as critical that the frequency of the Data-In be uniform, since the frequency tuning circuitry can adjust the clock speed of the peripheral device 110 to match the frequency of the Data-In as needed.

If the peripheral device 110 operates at approximately the same frequency over an extended period of time, an increased level of electromagnetic radiation may be emitted at that frequency. This elevated level of radiation may exceed allowable regulatory requirements for USB devices. Expensive shielding or distancing of circuitry and components may then be required for reducing the emission levels.

To reduce electromagnetic radiation, a spread spectrum circuit 130 may be included that varies the frequency of the peripheral device 110 and prevents the frequency from remaining at any one value for an extended period of time.

Figure 2:
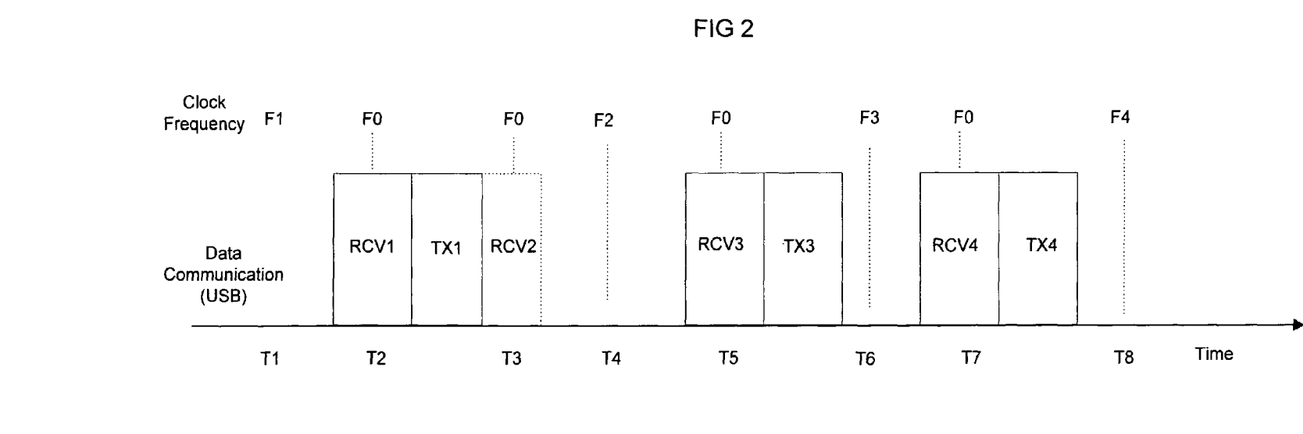
FIG. 2 is an example spread spectrum clock frequency timeline.

FIG. 2 shows a frequency timeline for the peripheral device 110, wherein the frequency operates at a center frequency F0 during communication with the USB host 100 and is then varied to one or more frequencies F1-F4 when the peripheral device 110 is not communicating with USB host 100.

At a time T1, the peripheral device may be operating at a frequency F1, which may or may not be the same as the center frequency F0. At a time T2, a data packet RCV1 is received by the peripheral device 110 and the frequency is tuned to the center frequency F0. The peripheral device 110 may then remain at the same center frequency F0 during subsequent transmission of one or more reply packets TX1. At a time T3, a data packet RCV2 is received immediately after, or in close proximity, to the reply packet TX1. The peripheral device 110 may then remain at the center frequency F0 (operable frequency) from time T2 to time T3.

At a time T4, the peripheral device 110 becomes idle if no more data is received or transmitted. The spread spectrum circuit 130 may then vary the peripheral device operating frequency to a frequency F2 which may be different from the center frequency F0 and frequency F1. At a time T5 the peripheral device 110 may receive a data packet RCV3 and subsequently transmit a reply packet TX3, during which time the peripheral device 110 may again be tuned to the center frequency F0. At a time T6 the peripheral device 110 is idle and yet another different frequency F3 is generated. At a time T7 a data packet RCV4 is received and reply packet TX4 is transmitted, and accordingly the center frequency F0 is reselected. At a time T8, the spread spectrum circuit 130 may generate yet another frequency F4 which may be different from all previous frequencies. The timeline would typically continue for an indefinite period with additional packets being received and different frequencies selected when data is not being transmitted or received.

FIG. 2 shows an example of alternating intervals when the peripheral device 110 is active and idle, and frequencies alternating between a center frequency F0 and other frequencies F1-F4. However, there may be times of heavy communication when data may be continuously received and transmitted. In these situations, the peripheral device 110 may remain at the center frequency F0 for an extended period of time. This is shown at times T2 and T3 wherein data packet RCV1 and data packet RCV2 are received sequentially and the frequency of the peripheral device 110 remains at the center frequency F0. Similarly, the peripheral device 110 may remain at some other frequency F1-F4 when it is idle for an extended period of time.

Figure 3:
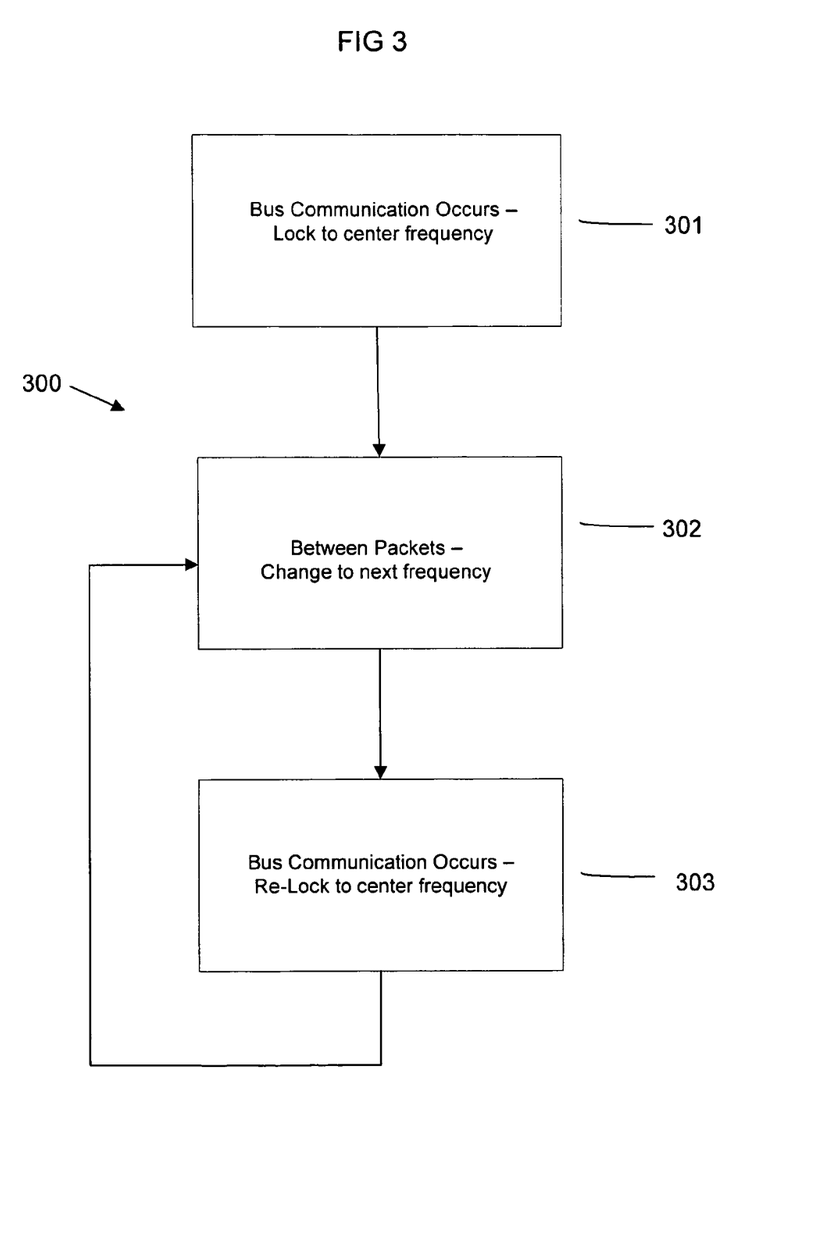
FIG. 3 is a flow diagram describing spread spectrum logic.

A flow diagram 300 for the spread spectrum circuit 130 is shown in FIG. 3. The USB host 100 sends data across a USB bus to a peripheral device. At operation 301 a data packet is sent to the peripheral device 110, a USB bus communication occurs, and the peripheral device 110 locks to the center frequency F0 of the packet transmission signal. The spread spectrum circuit 130 selects another frequency at operation 302, in between USB bus communication, when no data packet is addressed to the peripheral device 110.

At operation 303, the USB bus communication resumes at the center frequency F0 when another data packet is addressed to the peripheral device 110. Operations 302 and 303 may then be repeated as subsequent data packets are sent to and received by the peripheral device 110. As previously discussed, if the peripheral device 110 receives consecutive data packets, then it may remain at the center frequency F0 for an extended period of time without varying its frequency.

Figure 4:
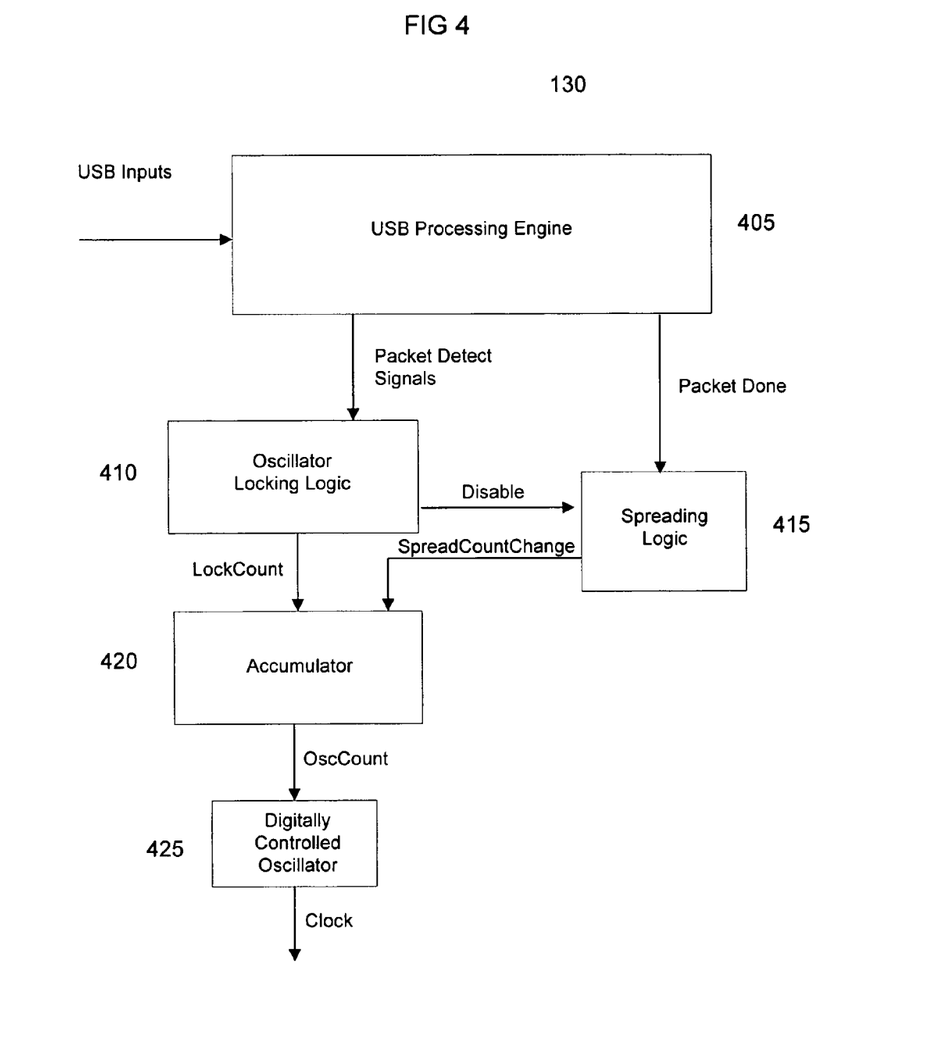
FIG. 4 is a more detailed diagram of a spread spectrum circuit shown in FIG. 1.

Referring next to FIG. 4, an example of the spread spectrum circuit 130 is shown in more detail. The spread spectrum circuit 130 can be used in peripheral devices such as a USB mouse or keyboard, as well as other devices or circuits that may or may not operate at a low speed. The spread spectrum circuit 130 of FIG. 4 includes a USB processing engine 405, an oscillator locking logic circuit 410, a spreading logic circuit 415, an accumulator 420, and a digitally controlled oscillator 425.

The components and circuitry in the spread spectrum circuit 130 could be included in a single Integrated Circuit (IC) component or in multiple components and still function substantially similar as described herein. For example, the USB processing engine 405, the oscillator locking logic circuit 410, the spreading logic circuit 415 and the accumulator 420 could be included in one circuit, and the digitally controlled oscillator 425 could be included in a separate circuit. The functions performed by the digitally controlled oscillator 425 may also be implemented as a programmable oscillator, for example.

The spread spectrum circuit 130 shown in FIG. 4 is shown implemented in a hardware solution, however it may also be implemented in firmware or in software using a programmable processing device. A hardware solution may provide for increased speeds of operation and rates of spread spectrum frequency generation.

USB inputs are sent by the USB host 100 as a stream of data or data packets to all of the peripheral devices connected to the USB bus. The USB processing engine 405 receives the USB input and determines if the data packet is received by the peripheral device 110. The USB processing engine is further able to distinguish and detect different types of data packets that the oscillator 425 may lock to. When data is received, the USB processing engine 405 sends a packet detect signal to the oscillator locking logic circuit 410, to indicate that a start of packet event has occurred. The oscillator locking logic circuit 410 may determine the center frequency F0 as well as an operable frequency range in which communication between the peripheral device 110 and the USB host 100 may occur.

The center frequency F0 may be determined according to an analysis of the data stream rather than according to an external precision timing element. As described in U.S. Pat. No. 6,297,705, an oscillator may be tuned to match a multiple of the data rates of the incoming signal. However it is noted that the spread spectrum circuit 130 is able to otherwise operate as described herein with or without the presence of an external precision timing element.

After the oscillator locking logic circuit 410 determines the center frequency F0, a lock count signal LockCount representing the center frequency F0 is sent to the accumulator 420. The accumulator 420 registers LockCount and generates an oscillator count signal OscCount associated with a target clock speed. OscCount may be sent to a look-up table to correct or tune the rate of oscillation as necessary, as further described in U.S. Pat. No. 6,297,705. OscCount may then be used by the digitally controlled oscillator 425 to control the rate and frequency of oscillation of the clock signal. The digitally controlled oscillator 425 generates a clock signal according to OscCount and is typically some multiple of the USB input data rate. OscCount may be incremented up or down in order to adjust or tune the frequency of oscillation.

Figure 5:
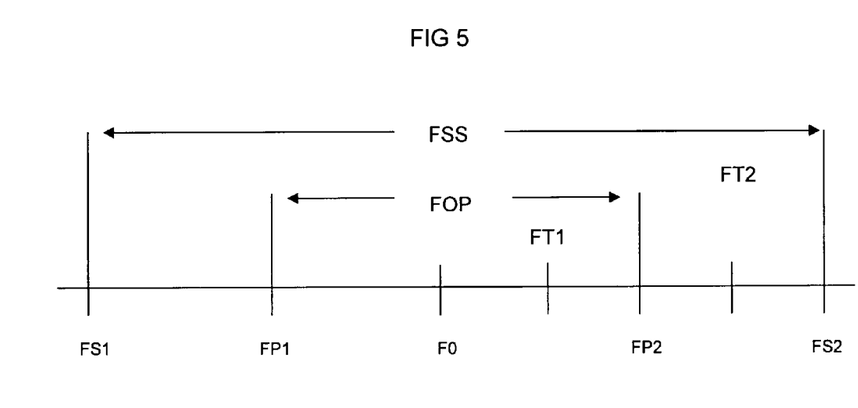
FIG. 5 is a chart illustrating different ranges of spread spectrum frequencies.

During communication with the USB host 100, the peripheral device 110 preferably operates within an operable frequency range FOP as shown in FIG. 5. Therefore, the spread spectrum circuit 130 may include an algorithm that would request an operating target frequency FT1 that is different than the center frequency F0 but still lies within the operable frequency range FOP. In this way, a moderate level of spread spectrum can be achieved even during communication with the USB host 100, by alternating the operating target frequency FT1 to different frequencies within the operable frequency range FOP. For example the accumulator 420, after receiving a LockCount associated with the center frequency F0, may increment or decrement its internal counter such that it generates an OscCount associated with a new frequency. Similarly, the spreading logic circuit 415 may be used in conjunction with the oscillator locking logic circuit 410 to send instructions to the accumulator 420 on how to vary the OscCount. The center frequency F0 does not need to be exclusively selected during communication as shown at times T2, T3, T5 and T7 of FIG. 2. Rather, the center frequency F0 can be replaced with the operating target frequency FT1 located anywhere within the operable frequency range FOP.

Referring again to FIG. 4, after communication between the USB host 100 and the peripheral device 110 has been completed, the USB processing engine 405 determines that an end of packet event has occurred and sends a Packet Done signal to the spreading logic circuit 415. The end of packet event may be determined according to an internal interrupt contained within the peripheral device 110, for example. The spreading logic circuit 415 may be activated exclusively of the oscillator locking logic circuit 410, and may be disabled during data transmission. The spreading logic circuit 415 may contain an algorithm that determines a sequential or pseudo-random change to the clock speed. The spreading logic circuit 415 sends a spread spectrum count change signal Spread-CountChange to the accumulator 420 for further processing. If the accumulator 420 had previously identified a LockCount associated with the center frequency F0, it may then increment or decrement its counter by the SpreadCountChange and store this new value in its register. The accumulator 420 may then send an OscCount associated with an initial spread spectrum target frequency FT2 signal to the digitally controlled oscillator 425 which then generates the clock signal as before.

In an alternative embodiment, the spreading logic circuit 415 is not disabled during data transmission and instead provides the SpreadCountChange signal to the accumulator 420 in order to spread the frequencies in the operable frequency range FOP even during data transmission. In this way, a spread spectrum is being accomplished at all times when the peripheral device 110 is active and idle.

The accumulator 420 may store a count associated with a target frequency in its register and therefore assist in subsequent tuning of the oscillator 425 to a center frequency F0 associated with a next received data packet. By retaining prior knowledge of frequency selection, the oscillator 425 may be able to lock into the data stream more rapidly when new data is received. Similarly, the accumulator 420 may use the stored count to help generate subsequent frequencies associated with a spread spectrum algorithm.

The spread spectrum target frequency FT2 may be selected from within the operable frequency range FOP that is bounded by a lower operable frequency FP1 and by an upper operable frequency FP2. As shown in FIG. 5, FT2 may also be selected from a spread spectrum frequency range FSS that is bounded by a still lower spread spectrum frequency FS1 and by a still greater upper spread spectrum frequency FS2 as compared to the operable frequency range FOP. The lower spread spectrum frequency FS1, therefore, may be less than the lower operable frequency FP1, and the upper spread spectrum frequency FS2 may be greater than the upper operable frequency FP2. As a result, spread spectrum target frequency FT2 may be located inside as well as outside of the operable frequency range FOP. In this way, an even greater amount of spread spectrum can be achieved when the peripheral device 110 remains idle, by alternating the spread spectrum target frequency FT2 to different frequencies within the spread spectrum frequency range FSS. This may result in a further measurable reduced level of the electromagnetic emissions beyond that achieved by varying the frequency solely within the operable frequency range FOP.

The digitally controlled oscillator 425 typically achieves an operating accuracy to within plus or minus 1.5% tolerance of the center frequency F0 when a low-speed peripheral USB device is in communication with the USB host 100. For example, if the peripheral device 110 is operating at 24 MHz, this would provide an operable frequency range FOP of 720 kHz. If the peripheral device 110 is operating at a frequency outside of the operable frequency range FOP, it is desirable to tune to an operating target frequency FT1 during an initial transmission period of data. Otherwise, a communication failure may occur.

The digitally controlled oscillator 425 having a 60 kHz per step resolution, for example, is able to timely lock in to the operable frequency range FOP from a spread spectrum target frequency FT2 that is plus or minus 3% of the center frequency F0. This provides a spread spectrum frequency range FSS of 1440 kHz when the peripheral device is idle. In practice, it may be desirable to restrict the upper and lower spread spectrum frequencies FS1 and FS2 that bound the spread spectrum frequency range FSS to improve reliability of the system. For example, the spread spectrum frequency range FSS may be specified at approximately plus or minus 2% of the center frequency F0. In this way, a wide spreading range can be achieved, even beyond the accuracy limits of the bus communication, but while still maintaining reliable communication.

Referring again to FIG. 2, the example spread spectrum clock frequency timeline shows alternating frequencies between the center frequency F0 during data transmission and between the spread spectrum target frequency FT2 when the peripheral device 110 is idle. Spread spectrum target frequency FT2 is shown in FIG. 2 by sequentially increasing frequencies of F2-F4. FIG. 2 is not intended to suggest a limit of four frequencies outside of the center frequency F0. Rather, a finite number of available frequencies may be determined by the clock speed and the resolution of the digitally controlled oscillator 425, for example. When the sequentially increasing frequency reaches the upper spread spectrum range FS2, for example, the accumulator 420 can restart its register and provide an OscCount associated with the frequency F1.

Many alternative algorithms for oscillating the spread spectrum frequencies are possible, including selecting a random or pseudo-random frequency generation. For example, instead of sequentially alternating frequencies between F0 and the spread spectrum target frequency FT2, a pseudo-random frequency generation algorithm could be used that would result in any combination of pseudo-random frequencies. Example pseudo-random generation algorithms are described in co-pending U.S. patent application Ser. No. 10/147,828 RANDOM NUMBER GENERATOR, assigned to Cypress Semiconductor Corporation, the assignee of the present patent, and which is herein incorporated by reference.

Notwithstanding the many algorithms available, it remains desirable to select a target frequency that lies within the operable frequency range FOP shown in FIG. 5 during data transmission. In other words, the center frequency F0 shown in FIG. 2 may be replaced with any sequence of frequencies wherein each frequency is greater than the lower operable frequency FP1 and less than the upper operable frequency FP2 during data transmission.

Figure 6:
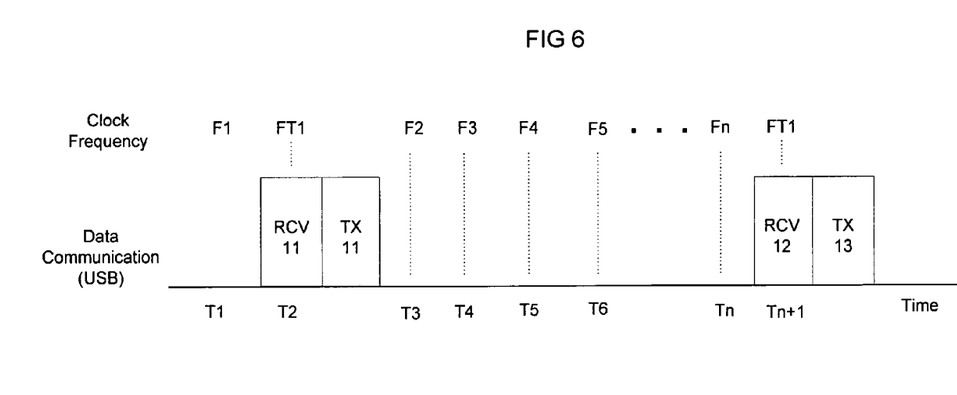
FIG. 6 is an alternative example spread spectrum clock frequency timeline.

FIG. 6 shows an alternative embodiment wherein the spread spectrum frequencies may be varied according to a set period of time. In one embodiment, the frequency may be varied each time that a USB frame marker is sent, or after some multiple of USB frame markers has been sent. Frame markers are typically sent by the USB host 100 once every millisecond whether or not they contain any data, and therefore may be used as a timer for a spread spectrum algorithm. At time T1, the peripheral device 110 may be operating at the frequency F1. Upon receiving a data packet RCV11 at a time T2, the digitally controlled oscillator 425 may lock to the operating target frequency FT1. After transmitting reply packet TX11 and at a time T3, a frequency F2 may be selected. Similarly, at some increment of time denoted by times T4, T5 and T6 through Tn, the peripheral device 110 is made to operate at sequential frequencies F3, F4 and F5 through Fn respectively.

When a next data packet RCV12 is received by the peripheral device 110 at time Tn+1, the digitally controlled oscillator 425 may once again generate a clock speed associated with the operating target frequency FT1 to facilitate communication with the USB host 100. As discussed, the operating target frequency FT1 specified at time Tn+1 may be different then the operating target frequency FT1 specified at time T2.

Frequencies F1-Fn in FIG. 6 may be located anywhere in the spread spectrum frequency range FSS, and may further be described and represented in FIG. 5 as the spread spectrum target frequency FT2. When a frequency Fn is generated at some finite time Tn, the accumulator 420 may reset its register such that OscCount would restart at a count associated with the selection of frequency F1 for the next received data packet. Alternatively, a pseudo-random frequency generation algorithm could be used that may result in any combination of pseudo-random frequencies that would be selected at each increment of time or event. Furthermore, the increments of time may also be selected according to a pseudo-random generation algorithm such that the changes in frequency would not occur at regular intervals.

Oscillating the frequency within the operable frequency range FOP during data transmission, and within the spread spectrum frequency range FSS when the peripheral device 110 remains idle may reduce overall electromagnetic emission. In an alternative embodiment the spread spectrum circuit 130 may continuously oscillate frequencies at pseudo-random time intervals and combine this with a pseudo-random frequency generation algorithm which may result in additional varying combinations and sequences of selected frequencies.

Combining different frequency generation algorithms when there are multiple peripheral devices connected to the USB host 100 may further result in an overall reduction in electromagnetic radiation being emitted at the same frequency. When each of the peripheral devices is using a different frequency generation algorithm, there is less likelihood that multiple devices will be operating at the same frequency for any substantial period of time. By decreasing the overall levels of electromagnetic emission in the USB system, this may also decrease electrical interference during communication between one or more peripheral devices and the USB host 100.

When a low number of data packets are being received by the peripheral device 110, it may be possible to increase the spread spectrum frequency range FSS. The digitally controlled oscillator 425 may be able to timely and consistently lock back to the operable frequency range FOP from a point closer to the lower and upper spread spectrum frequencies FS1 an FS2 during infrequent data packet exchanges. In an alternative embodiment, the spreading logic circuit 415 may vary the spread spectrum frequency range FSS proportional to the amount of data traffic over the USB bus, and more specifically to the data rate received by the peripheral device 110. In a USB Human Interface Device, or HID, there is normally a short initial phase of dense communication (enumeration), followed by a relatively sparse data exchange. More aggressive spreading may be used during this latter phase, which significantly dominates the operation time of such devices. Similarly, during high rates of data transmission, it may be advantageous to restrict the spread spectrum to the operable frequency range FOP, even when data is not being transmitted.

Different frequency generation algorithms can be selected according to the nature of the data being received by the peripheral device 110, or according to a specific application or mode of operation of the peripheral device 110. The spread spectrum logic may be incorporated in software, firmware, or hardware. Furthermore, the spread spectrum logic may be incorporated in communication systems other than USB, for example in Peripheral Component Interconnect (PCI) Express.

Additional benefits that may be obtained from the spread spectrum logic include a reduction in the cost associated with shielding circuitry and components within a device or between devices, as well as the potential to reduce the size of devices or improve their design. For example, the spread spectrum logic helps facilitate an inexpensive keyboard design that includes a single-sided circuit board, instead of the more expensive dual-sided circuit boards.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles.

We claim all modifications and variation coming within the spirit and scope of the following claims:

1. A timing circuit comprising a crystal-less oscillator to generate a clock frequency from a Universal Serial Bus data packet transmission signal and to alternate the clock frequency between a data packet transmission operating frequency and a non-operating frequency outside of the packet transmission operating frequency, wherein the non-operating frequency is derived independently of the transmission operating frequency.

2. The timing circuit according to claim 1 wherein the clock frequency is alternated to the non-operating frequency when a device comprising the timing circuit is idle.

3. The timing circuit according to claim 1 wherein the clock frequency remains at the operating frequency while receiving data packets.

4. A method for generating a clock signal, comprising:
   determining an operating frequency range for receiving or transmitting a data stream wherein the operating frequency range comprises a range of operational frequencies;
   determining a communication frequency within the operating frequency range;
   locking a clock to the communication frequency during a packet exchange; and
   tuning the clock to one or more frequencies within a spread spectrum frequency range after the packet exchange, wherein the spread spectrum frequency range includes frequencies located outside of the operating frequency range and is independent of the communication frequency.

5. The method according to claim 4 wherein the operating frequency range of operational frequencies is different for receiving than for transmitting the data stream.

6. The method according to claim 4 including varying the clock within the operating frequency range for individual subsequent packet exchange.

7. The method according to claim 4 including tuning the clock to multiple frequencies within the spread spectrum frequency range before locking the clock to the communication frequency.

8. The method according to claim 4 whereby the spread spectrum frequency range overlaps the operating frequency range.

9. The method according to claim 4 including varying the spread spectrum frequency range according to an amount of data traffic in the data stream.

10. The method according to claim 4 including deriving the clock from the communication frequency.

11. A Universal Serial Bus (USB) communication system comprising a peripheral device to exchange data and derive a clock signal from data signaling used for exchanging the data, the peripheral device to select and operate the clock signal at an alternate frequency outside and derived independently of a communication frequency used for the data signaling when the peripheral device is not transmitting or receiving the data, the peripheral device further to reset the alternate frequency to an initial frequency after cycling through a spread spectrum frequency range wherein the spread spectrum frequency range is independent of the communication frequency.

12. The Universal Serial Bus communication system according to claim 11, the peripheral device further to derive the clock signal from the data signaling without using separately generated clock signaling.

13. The Universal Serial Bus communication system according to claim 11, the peripheral device further to vary the alternate frequency after exchanging the data with the host device.

14. The Universal Serial Bus communication system according to claim 13, the peripheral device further to delay the alternate frequency according to an amount of data frames exchanged with the host device.

15. The Universal Serial Bus communication system according to claim 13, the peripheral device further to pseudo-randomly vary the alternate frequency.

16. The Universal Serial Bus communication system according to claim 11 including a look-up table that selects the alternate frequency.

* * * * *